Patented Sept. 30, 1941

2,257,216

UNITED STATES PATENT OFFICE 2,257,216

WATER-INSOLUBLE AZO DYESTUFFS

Werner Zerweck and Walter Brunner, Frankfort-on-the-Main-Fechenheim, Germany, assignors to General Aniline & Film Corporation, New York, N. Y., a corporation of Delaware No Drawing. Application April 4, 1940, Serial No. 327,830. In Germany April 14, 1939

4 Claims. (Cl. 260—203)

Our present invention relates to waterinsoluble azo-dyestuffs more particularly to those of the general formula:

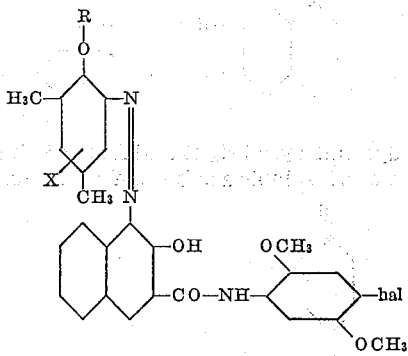

wherein R stands for a member of the group consisting of phenyl and chlorophenyl and X for a member of the group consisting of hydrogen and halogen. They are obtained by combining as such or on a substratum the diazocompound of 1-amino-3.5-dimethyl-6-phenoxybenzenes which contain in one of the benzene nuclei halogen with a 2'.3'-hydroxynaphthoyl - 1 - amino - 2.5-dimethoxy-4-halogenobenzene.

The present new dyestuffs are distinguished by a remarkable beauty and clearness of shade and good fastness properties, particularly to a boiling caustic soda solution.

In order to further illustrate our invention the following example is given, the parts being by weight and all temperatures in degrees centigrade.

Example

Well boiled and dried cotton yarn is impregnated with a solution containing per liter 1.8 grs. of 1-(2'.3'-hydroxynaphthoylamino)-2.5-dimethoxy-4-chlorobenzene, 5 ccms. of a caustic soda solution of 34° Bé. and 5 ccms. of Turkey red oil and well centrifugated. Then without being dried the cotton goods is treated with a solution, containing per liter the diazo compound of 1.4 grs. of 1-amino-3.5-dimethyl-chloro-6-phenoxy-benzene which has been nearly neutralized by the addition of sodium acetate then well rinsed and soaped. In this manner on the fiber the dyestuff of the formula:

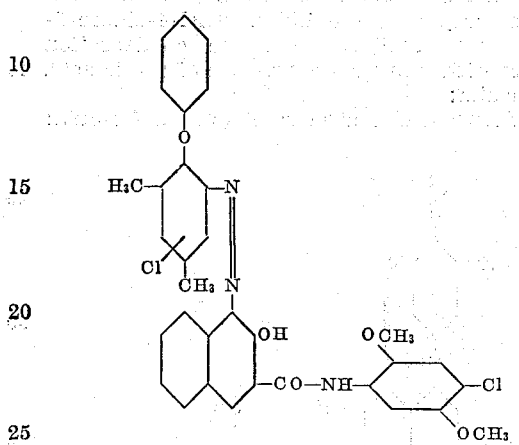

is obtained, which dyes bright and fast red shades.

1-amino-3.5-dimethyl-6-phenoxybenzene is obtainable by reacting with the potassium salt of phenol on 1.3-dimethyl-4-chloro-5-nitrobenzene and a subsequent reduction. It boils at 3 mms. at 155 to 156° and melts at 46°. By the action of sulfurylchloride in the presence of chlorobenzene, advantageously on its acetyl compound, a chlorine atom is introduced into the benzene nucleus. The formed halogeno compound crystallizes from alcohol as colorless needles of 76° melting point, the acetyl derivative melts at 143 to 144°.

When replacing the aforesaid diazo compound by the corresponding amount of the diazo compound of 1-amino-3.5-dimethyl-bromo-6-phenoxybenzene likewise bright red dyeings of good fastness properties are obtained.

The aforesaid bromo compound is obtainable by the action of bromine in the presence of glacial acetic acid on 1-amino-3.5-dimethyl-6-phenoxybenzene or advantageously its acetyl compound. The bromo compound crystallizes from methanol as colorless leaflets of 90° melting point, its acetyl-derivative melts at 168°.

When developing the impregnated cotton goods with a nearly neutralized diazo solution of 1-amino-3.5-dimethyl - 4' - chlorphenoxybenzene the formed dyestuff of the formula:

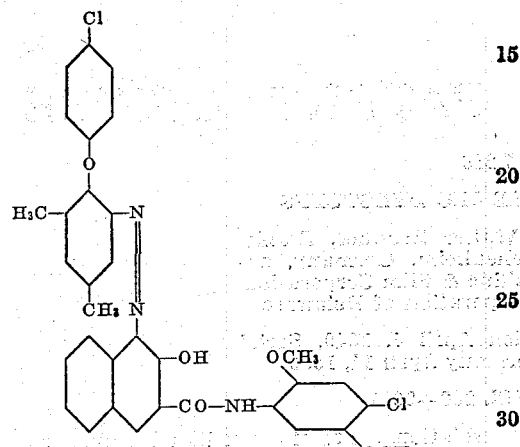

dyes bright and fast scarlet-red shades.

The aforesaid 1-amino-3.5-dimethyl-4'-chlorophenoxy benzene, which boils at 3 mms. at 168°, is obtainable by acting with the potassium salt of 4-chlorophenol on 1.3-dimethyl-4-chloro-5-nitrobenzene and reducing the condensation product with iron in the presence of acetic acid.

We claim:

1. Waterinsoluble azodyestuffs of the formula:

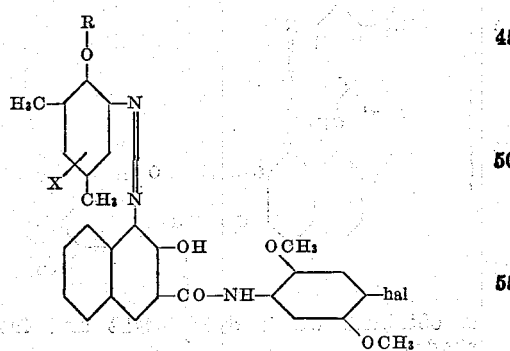

wherein R stands for a member of the group consisting of phenyl and chlorophenyl and X for a member of the group consisting of hydrogen and halogen, which dyestuffs are distinguished by a remarkable beauty of shades and good fastness properties.

2. A waterinsoluble azodyestuff of the formula:

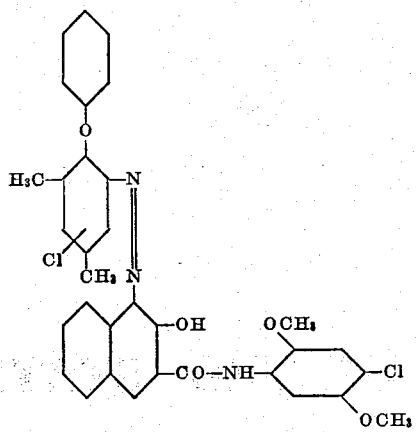

which dyestuff dyes bright and fast red shades.

3. A waterinsoluble azodyestuff of the formula:

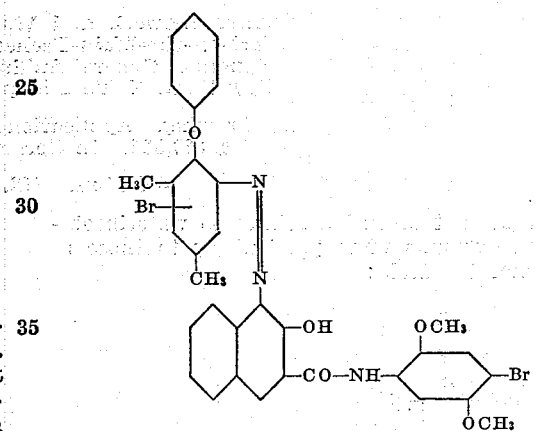

which dyestuff dyes bright and fast red shades.

4. A waterinsoluble azodyestuff of the formula:

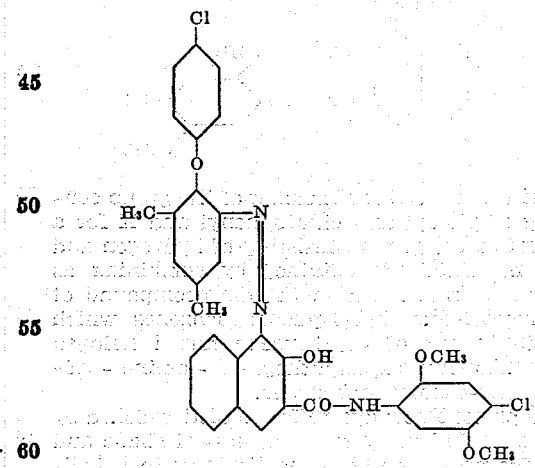

which dyestuff dyes bright and fast scarlet red shades.

WERNER ZERWECK.
WALTER BRUNNER.